United States Patent [19]
Watanabe

[11] 3,958,761
[45] May 25, 1976

[54] WATER DISCHARGE DEVICE FOR USE WITH IRRIGATION SYSTEMS

[75] Inventor: Sosuke Watanabe, Shimodate, Japan

[73] Assignee: Hitachi Chemical Company, Ltd., Tokyo, Japan

[22] Filed: June 7, 1973

[21] Appl. No.: 367,723

[30] Foreign Application Priority Data
June 9, 1972 Japan.............................. 47-67368
June 9, 1972 Japan.............................. 47-67369

[52] U.S. Cl................................ 239/542; 61/12; 138/42; 239/488; 285/13
[51] Int. Cl.² ................... B05B 1/16; B05B 15/00; F16L 55/00
[58] Field of Search ............... 285/13, 14, 156, 334, 285/390, 391, 402; 61/12; 138/42, 45; 239/542, 488

[56] References Cited
UNITED STATES PATENTS

| | | | |
|---|---|---|---|
| 2,610,089 | 9/1952 | Unger | 285/156 X |
| 2,674,785 | 4/1954 | Crawley | 285/156 X |
| 2,752,201 | 6/1956 | Blass | 239/488 X |
| 3,359,013 | 12/1967 | Knox et al. | 285/13 |
| 3,586,239 | 6/1971 | Blass | 239/542 X |
| 3,604,728 | 9/1972 | Symcha | 285/14 |
| 3,642,394 | 2/1972 | Geil | 138/42 X |
| 3,746,263 | 7/1973 | Reeder et al. | 239/542 |

Primary Examiner—Richard C. Queisser
Assistant Examiner—Daniel M. Yasich
Attorney, Agent, or Firm—Stewart and Kolasch, Ltd.

[57] ABSTRACT

A water discharge device for use with irrigation systems, comprising a tubular element formed with female threads at the inside surface thereof and a screw element formed with male threads at the outside surface threof, the height of said female threads being different from that of said male threads, whereby a helical passage is formed along the female and male threads, through which water is moderately discharged under reduction of pressure.

15 Claims, 5 Drawing Figures

WATER DISCHARGE DEVICE FOR USE WITH IRRIGATION SYSTEMS

BACKGROUND OF THE INVENTION

1. Field of the Invention:

This invention relates to a water discharge device for use with irrigation systems.

2. Description of the Prior Art:

Conventionally, irrigation of a farm is generally performed by employing a pipe formed with small openings therealong, said small openings each being adapted to receive a small tube such as a vinyl tube through which water is released preferably in the form of drops. In this kind of irrigation system, water is supplied through the pipe at a relatively low pressure to avoid too quick discharging of water. However, when such an irrigation pipe supplying water at a relatively low pressure is to be extended over a relatively long distance to operate with a number of small openings formed therealong, the pressure at the end portion of the pipe becomes very low, substantially reducing the water flow from the end portion of the pipe. Furthermore, since in the conventional irrigation system, each water supply port formed by the small vinyl tube is directly connected to the main supply pipe with no interposition of pressure reducing means, the unbalance of water flow rate along the length of the pipe becomes very large and the flow through each water discharge port fluctuates very largely according to small fluctuations of the pressure in the main pipe.

In order to avoid the large unbalance of water discharge rate along the length of the pipe in the conventional irrigation system, it is proposed to use a water discharge device as shown in FIG. 1, incorporating a pressure reducing structure so that the water pressure in the main pipe is kept at a relatively high level with no danger of discharging water at a too high rate. The water discharge device shown in FIG. 1 comprises a tubular element 1 having a connecting end portion 2 adapted to be inserted into an end portion of the hose. In the tubular element is inserted a screw element 3 also having a connecting end portion 4 of the same structure as the connecting end portion 2 of the tubular element 1, the screw element being formed with square threads 5 at the outside surface thereof. The screw element 3, as engaged into the mating grooves of tubular element 1, cooperates with the inside surface of the tubular element to provide a helical groove 6 communicating at one end thereof with a main passage 7 formed through the water discharge device by way of an annular opening 8 left between a counterbored portion of the tubular element and an end of the screw element 3, said groove 6 opening at the other end thereof to the outside of the water discharge device to provide a water discharge port 9.

By employing the water discharge device as shown in FIG. 1, water for irrigation or a mixture of water and a liquid manure fed at a relatively high pressure such as 1 – 2 Kg/cm² through the passage provided by several pieces of the water discharge devices as well as several pieces of hoses connecting the water discharge devices is partly and gradually leaked out of the passage through the helical groove 6 to be moderately discharged out of the water discharge port 9. Since in this case the water pressure in the main supply pipe is kept at a high level and the water is reduced of its pressure at each water discharge device to produce a moderate water discharge flow from each water device, the unbalance of water flow rate between root and tip portions of the main water flow passage is small, making it possible to apply uniform irrigation to the entire region of the farm.

However, the conventional water discharge device as shown in FIG. 1 has the following drawbacks:

a. Since the tubular element and the screw element are assembled together to provide the water discharge device, clearances are apt to be formed between the fitting surfaces due to external causes, such as mechanical forces or hydraulic pressure, and if such clearances are formed, much amount of water under the pressure of 1 – 2 Kg/cm² shortcuts the clearance, causing too high discharging rate of water. It is almost impossible to avoid the formation of such clearance, and since such clearances are formed in a very irregular manner, the unbalance of the water discharging rate is very large.

b. Since the depth of engagement between the tubular element 1 and the screw element 3 can not be readily adjusted, the resistance of the groove 6 or the water discharging rate can not be easily controlled. If the screw element 3 is fixedly mounted into the tubular element 1 to avoid the formation of the abovementioned clearances, it becomes difficult to disassemble the device to take out the screw element 3 from the tubular element 1 for the purpose of cleaning.

SUMMARY OF THE INVENTION

Therefore, it is the object of this invention to avoid the abovementioned drawbacks and to provide an improved water discharge device for use with irrigation systems.

The abovementioned object is accomplished, according to this invention, by a water discharge device for use with irrigation systems, comprising a tubular element formed with female threads at the inside surface thereof and a screw element formed with male threads at the outside surface thereof, said male threads being adapted to engage with said female threads, wherein the height of said female threads is different from that of said male threads.

In the water discharge device according to this invention, the screw element formed with male threads is removably screwed into the tubular element formed with female threads by said male and female threads being engaged with each other, and since the height of the female threads is different from that of the male threads, a helical clearance is left between the engaging male and female threads, said clearance providing a pressure reducing passage for the water supplied at a relatively high pressure to be moderately discharged therethrough. Since in this structure the two adjacent passage portions along a helical line are positively separated from each other by the engaging male and female threads, radial deformations of the tubular element and/or the screw element do not cause any substantial short cut between the two adjacent passage portions, whereby the fluctuations of the flow rate due to deformations of the elements of the water discharge device under application of a fluctuating hydraulic pressure are avoided. The pressure reduction of the water flowing through the helical passage is estimated by calculation, and therefore, it is possible to obtain an irrigation system which operates correctly as designed. Furthermore, the pressure reduction through the helical passage can be easily controlled by adjusting the depth of engagement between the tubular element and the screw element by turning one relatively to the other, whereby the overall balance of operation of the irrigation system can be readily modified as required. When the helical passage has been clogged with dust, sand, aquatic plant, iron powder, etc., the alien substance can be easily removed by disengaging the screw element from the tubular element.

The male and female threads having different heights of threads and adapted to engage with each other to leave a helical passage therealong may preferably be square threads so that radial deformations of the tubular and/or screw element do not cause formation of clearances to shortcut adjacent passage portions of the helical passage, and in addition, the design and manufacture of the water discharge device are facilitated. However, the male and female threads may be any one of the other types of threads such as triangular, round, trapezoidal threads, etc.

BRIEF DESCRIPTION OF THE DRAWING

In the accompanying drawing.

DESCRIPTION OF THE PREFERRED EMBODIMENTS

Figure 1:
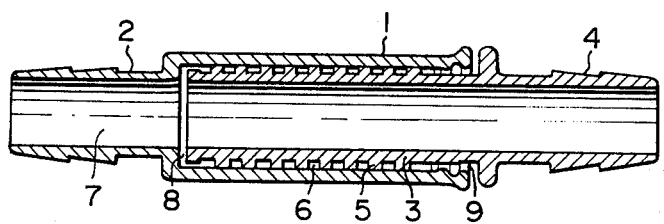
FIG. 1 is an axial section of a water discharge device as an example of the prior art; and, FIGS. 2 – 5 are axial sections of several embodiments of the water discharge device according to this invention.
Figure 2:
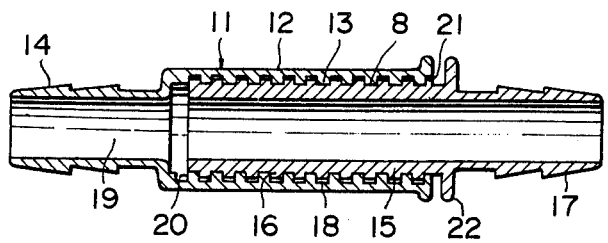

Referring first to FIG. 2, the water discharge device generally designated by reference numeral 11 comprises a tubular element 12 formed with female square threads 13 at the inside surface thereof and having a connecting end portion 14 of a relatively reduced diameter, and a screw element 15 formed with male square threads 16 at the outside surface thereof and having a connecting end portion 17 of a relatively reduced diameter, the latter being engaged into the former by the male and female square threads being engaged with each other. In this embodiment, the female square threads 13 have a larger height of threads than the male square threads 16, whereby a helical passage 18 is defined by opposite side faces and bottom face of the female square threads 13 and top faces of the male square threads 16. The helical passage is in communication with a main passage 19 formed through the tubular element 12 and the screw element 15 at an end thereof designated by reference numeral 20 and is opened to the outside of the device at the other end thereof designated by reference numeral 21, where the helical passage opens to the atmosphere as a water discharge port.

The difference between the height of the female and male square threads may be properly selected in relation to the pitch of the threads to provide a required cross sectional area of the helical passage. The connecting end portions 14 and 17 are inserted into end portions of hoses (not shown). A flange 22 is provided to check the discharged water from flowing over the outer surface of the hose mounted to the connecting end portion 17.

Figure 3:
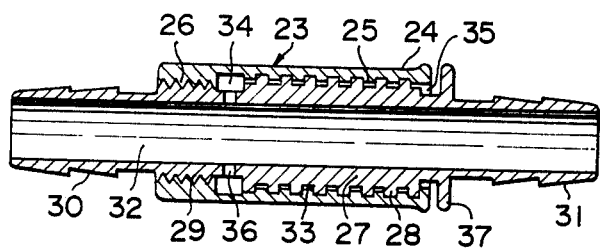

FIG. 3 shows a second embodiment of the water discharge device according to this invention. In this embodiment, the device generally designated by reference numeral 23 comprises a tubular element 24 formed with female square threads 25 at a substantial portion of the inside surface threof as well as female triangular threads 26 at the remaining portion of the inside surface thereof, and a screw element 27 formed with male square threads 28 at a substantial portion of the outside surface thereof as well as male triangular threads 29 at the remaining portion of the outside surface thereof. In this embodiment, connecting end portions 30 and 31 to be inserted into cooperating end portions of adjacent hose sections are formed to be integral with the screw element 27, so that in this case a through passage 32 extending from the connecting end portion 30 to the other connecting end portion 31 is provided by a screw element 27. The female and male square threads 25, 28 and the female and male triangular threads 26, 29 have a same pitch so that the tubular element 24 is engaged onto or disengaged from the screw element 27 by turning two elements relatively to each other while having either of the square or triangular female threads engaged with either of the square or triangular male threads. The male square threads 28 have a larger height of threads than the female square threads 25 so that the female and male square threads in engagement provide a helical passage 33 defined by opposite side and bottom faces of the male square threads 28 and top faces of the female square threads. The helical passage 33 is in communication with an annular groove 34 at an end thereof, said annular groove 34 being defined by cooperating grooved portions of the tubular element 24 and the screw element 27, and is opened to the outside of the device at the other end thereof, where a water discharge port 35 is defined. The annular groove 34 is in communication with the through passage 32 by way of several radial openings 36. Water or a mixture of water and a liquid manure flowing through the through passage 32 is first introduced into the annular groove 34 and is then passed through the passage 33 while being reduced of its pressure and is finally discharged from the port 35 at a designed moderate discharge rate. If an increase of discharge rate is required to adjust a balance of discharge rate of the irrigation system, the tubular element 24 is turned relatively to the screw element 27 so that the tubular element is to be shifted leftward seen in FIG. 3, whereby the length of the helical passage 33 is shortened to reduce the pressure reduction therethrough and the water discharge rate from the port 35 is correspondingly increased. A flange 37 is provided to check the water discharged from the port 35 from flowing over the outer surface of the hose connected to the connecting end portion 31.

Figure 4:
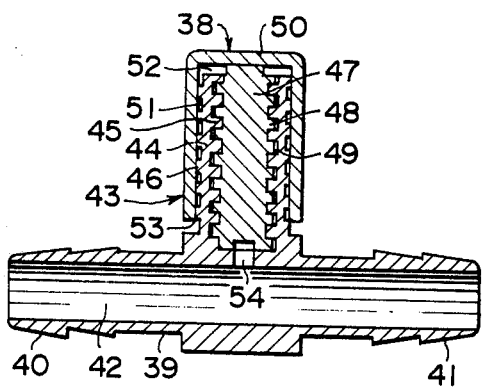

In the third embodiment shown in FIG. 4, the water discharge device 38 is formed in T-type including a through passage portion 39 having connecting end portions 40 and 41 and defining a through passage 42 and pressure reducing portion 43 composed of a tubular element 44 formed with female square threads 45 at the inside surface thereof and male square threads 46 at the outside surface thereof, a screw element 47 formed with male square threads 48 at the outside surface thereof, said screw element 47 being inserted into the tubular element 44 to form a helical passage 49 defined by the female and male square threads in the same manner as in the embodiment shown in FIG. 2, and a cover member 50 engaged onto the tubular element 44 to define a second helical passage 51 which is in communication with the first helical passage 49 by way of an annular space 52 at one end thereof and is opening to the outside of the device at the other end thereof, where a water discharge port 53 is defined. The helical passage 49 is in communication with the through passage 42 by way of a passage 54, through which water or a mixture of water and a liquid manure flowing through the main passage 42 is introduced into the helical passage 49, and the water or mixture having been reduced of its pressure through the helical passages 49 and 51 is discharged form the port 53 at a designed moderate flow rate. Since in this case, the water pressure is substantially reduced while the water flows through the first helical passage 49, the pressure of water flowing through the second helical passage 51 is relatively low, and therefore, there occurs no problem that the cover member 50 is deformed due to the water pressure and there is formed a clearance short cutting adjacent passage portions of the second helical passage 51. Therefore, the cover member 50 may be relatively loosely mounted over the tubular member 44 and the cover member 50 itself may be formed of a relatively soft and resilient material so that the cover member may be easily mounted onto or dismounted from the tubular element 44 for the purpose of cleaning, etc. This embodiment is designed not to increase the length of the pressure reducing portion 43 projected sidewardly from the through passage portion 39 by turning the latter half 51 of the pressure reducing helical passage by 180° to the former half 49 to overlap one over the other.

Figure 5:
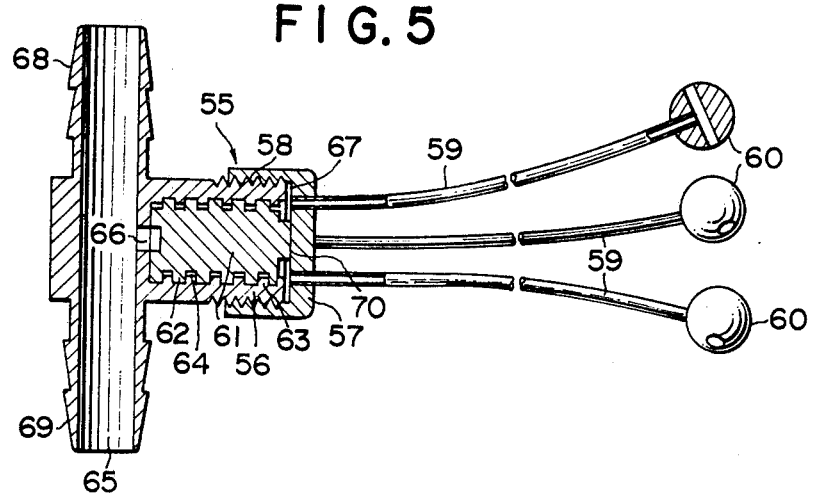

In the embodiment shown in FIG. 5, the water discharge device 55, which is also constituted as of T-type as the one shown in FIG. 4, a tubular element 56 and a cover member 57, these two members corresponding to the members 44 and 50 in FIG. 4, are positively engaged with each other by triangular threads 58. Furthermore, in this embodiment, the cover member 57 is mounted with small tubes 59 equipped with nozzle means 60 at their top end portions to further distribute the water to be discharged. In this embodiment, a screw element 61 corresponding to the screw element 47 is FIG. 4 is formed with male square threads 62, the height of which is larger than that of female square threads 63 formed at the inside surface of the tubular element 56, providing a helical passage 64 which is in communication at one end with a through passage 65 by way of a passage 66 and is in communication with the small tubes 59 at the other end thereof by way of an annular space 67. The water discharge device 55 shown in FIG. 5 is assembled to form an irrigation system in the same manner as that in FIG. 4 by opposite connecting end portions 68 and 69 being connected to hose sections. This device can be easily disassembled by first removing the cover member 57 and then the screw element 61 by, for example, a screw driver applied to a groove (not shown) formed at an end portion 70 thereof.

Although several preferred embodiments have been illustrated and explained in the above, various modifications are possible with these embodiments without departing from the spirit of this invention.

I claim:

1. A fluid discharge device for use with irrigation systems comprising a T-type body having a first tubular portion which defines a flow-through channel with oppositely directed connecting end portions adapted to be inserted into cooperating end portions of respective hoses, and a second tubular portion connected substantially perpendicular to said first tubular portion and provided with a free end portion, said second tubular portion being provided with female threads on the inside surface thereof and male threads on the outside surface of said free end portion, a screw element provided with male threads on the outside surface thereof, said screw element male threads engaging said female threads of said second tubular portion and defining therebetween a continuous flow passage therethrough, an aperture disposed in said first tubular portion, said aperture providing communication between said continuous flow passage and said flow-through channel, and a locking cap element disposed on the free end portion of said second tubular element in a manner to substantially close said free end and retain said screw element against rotation and axial movement, said cap element being provided with female threads which engage the male threads on the outside of said second tubular free end portion and a plurality of openings disposed in said cap element, said openings communicating with said continuous flow passage.

2. The fluid discharge device of claim 1, wherein said aperture communicates with one end of said continuous flow passage and said plurality of openings communicates with the other end of said continuous flow passage.

3. The fluid discharge device of claim 2, wherein said cap element contains an end wall and the openings provided in the end wall of said cap element are connected with small tubes which further distribute fluid to a wide distribution zone.

4. The fluid discharge device of claim 3, wherein said small tubes are provided with nozzle means which further divide the fluid flow into a plurality of flows.

5. The fluid discharge device of claim 1, wherein the height of said female threads which define said continuous flow passage is higher than that of the cooperating male threads.

6. The fluid discharge device of claim 1, wherein the height of said male threads which define said continuous flow passage is higher than that of the cooperating female threads.

7. The fluid discharge device of claim 1, wherein at least one of said male and female threads which cooperate to define said continuous flow passage are square threads.

8. A fluid discharge device for use with irrigation systems comprising a T-type body having a first tubular portion which defines a flow-through channel with oppositely directed connecting end portions adapted to be inserted into cooperating end portions of respective hoses and a second tubular portion connected substantially perpendicular to said first tubular portion and provided with a free end portion, said second tubular portion being provided with female threads on the inside surface thereof and male threads on the outside surface thereof, a screw element provided with male threads on the outside surface thereof, said screw element male threads engaging said female threads of said second tubular portion and defining therebetween a first continuous flow passage therethrough, a cover means covering said second tubular portion, said inside surface of the cover means and the male threads on the outside surface of the second tubular portion defining therebetween a second continuous flow passage therethrough, said first continuous flow passage communicating with said second continuous flow passage at one end of the second tubular portion and a fluid discharge port communicating with said second continuous flow passage at the other end of the second tubular portion, and an aperture disposed in said first tubular portion, said aperture providing communication between said first continuous flow passage and said flow-through channel.

9. The fluid discharge device of claim 8, wherein the height of said female threads which define said first continuous flow passage is higher than that of the cooperating male threads.

10. The fluid discharge device of claim 8, wherein the height of said male threads which define said first continuous flow passage is higher than that of the cooperating female threads.

11. The fluid discharge device of claim 8, wherein at least one of said male and female threads which cooperate to define said first continuous flow passage are square threads.

12. A fluid discharge device for use with irrigation systems comprising a tubular element provided with internal female square threads which extend a substantial distance from one end portion of the inside surface thereof and internal female triangular threads which extend from the other end portion of the inside surface thereof, a tubular screw element coaxially disposed within said tubular element, said screw element defining a flow-through channel therethrough and provided with external male square threads which extend along a substantial portion of the outside surface thereof and external male triangular threads disposed at the outside surface thereof, said male and female square threads being in screw engagement with each other and defining a continuous flow passage therebetween and said male triangular threads engaging said female triangular threads in a manner to retain said screw elements against rotation and axial movement, oppositely directed connecting end portions of said tubular screw element adapted to be inserted into cooperating end portions of respective hoses, said oppositely directed connecting end portions being integral with respective ends of the tubular screw element in forming said flow-through channel, annular groove means disposed between said square and triangular threads in said tubular element and screw element, said annular groove means including at least one opening through said screw element for providing communication between said flow-through channel and said continuous flow passage at one end of said screw element and a fluid discharge port communicating with said continuous flow passage at the other end of said screw element.

13. The fluid discharge device of claim 12, wherein the height of said female threads which define said continuous flow passage is higher than that of the cooperating male threads.

14. The fluid discharge device of claim 12, wherein the height of said male threads which define said continuous flow passage is higher than that of the cooperating female threads.

15. The fluid discharge device of claim 12, wherein at least one of said male and female threads which cooperate to define said continuous flow passage are square threads.

* * * * *